No. 763,765. PATENTED JUNE 28, 1904.
B. F. JOHNSON.
CABINET FOR TREATMENT OF HEMORRHOIDS OR OTHER DISEASES.
APPLICATION FILED NOV. 16, 1903.
NO MODEL.

Witnesses:
H. S. Gaittier
E. K. Lundy

Inventor:
Benjamin F. Johnson
by Frank D. Thomason
Attorney

No. 763,765. Patented June 28, 1904.

UNITED STATES PATENT OFFICE.

BENJAMIN F. JOHNSON, OF PONTIAC, ILLINOIS.

CABINET FOR TREATMENT OF HEMORRHOIDS OR OTHER DISEASES.

SPECIFICATION forming part of Letters Patent No. 763,765, dated June 28, 1904.

Application filed November 16, 1903. Serial No. 181,408. (No model.)

*To all whom it may concern:*

Be it known that I, BENJAMIN F. JOHNSON, a citizen of the United States, and a resident of Pontiac, in the county of Livingston and State of Illinois, am the inventor of certain new and useful Improvements in Cabinets for Treatment of Hemorrhoids or other Diseases, of which the following is a full, clear, and exact description.

The object of my invention is to provide a simply-constructed cabinet for the treatment of rectal and female diseases, by means of which the fumes arising from the medicaments contained within the same are directed to the affected parts and the quantity of the fumes so directed absolutely controlled so as to meet the requirements of each patient. This I accomplish by the means hereinafter fully described and as particularly pointed out in the claims.

Figure 1:
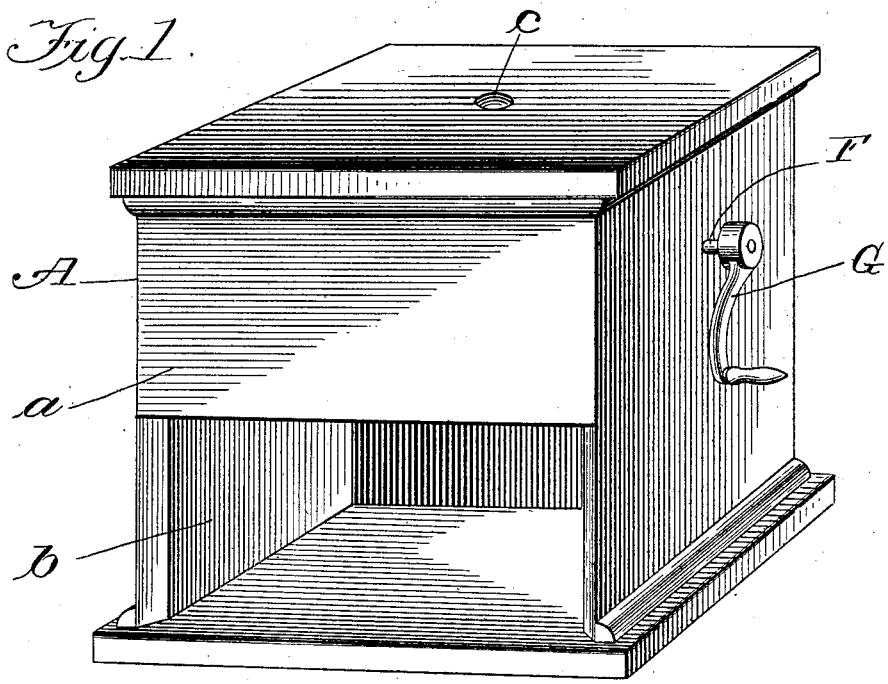
Figure 2:
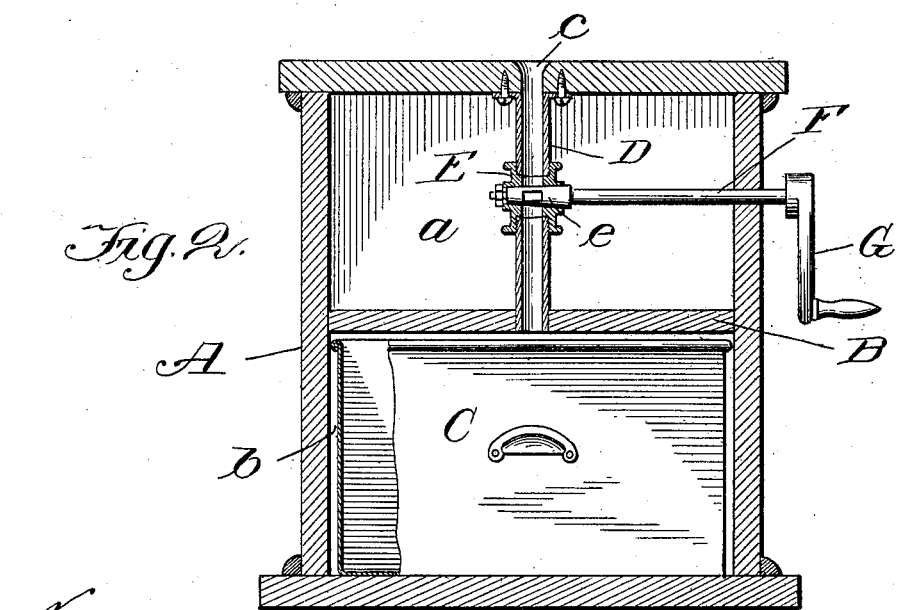

In the drawings, Figure 1 is a perspective view of my invention. Fig. 2 is a vertical transverse section thereof.

Referring to the drawings, A represents a rectangular box-shaped cabinet, which is divided into an upper compartment $a$ and a lower compartment $b$ by a horizontal partition B, preferably midway between its top and bottom. The lower compartment $b$ has a suitable doorway in front, which can be closed in any suitable manner so as to make a practically air-tight chamber, and it has placed therein a pan C, preferably of such shape and dimensions as to fit snugly in said chamber. The top of the cabinet is provided with an opening $c$, and this opening is connected with the lower chamber $b$ by means of a pipe D, the lower end of which preferably extends down into the opening in the partition B, through which communication with said lower chamber is had. I prefer to make pipe D of an upper and lower section and to connect the same by means of the casing E of an ordinary stop-cock $e$, the barrel of which is either secured to or made in one piece with a horizontal transverse shaft F, which extends through suitable bearings in the side of the case and is provided with a suitable crank G, as shown.

In operation a quantity of suitable medicaments is placed in the pan C, which is placed in the lower chamber $b$ of the cabinet and the latter securely closed. The patient then sits on the cabinet, so that the bare rectum or other affected parts are directly over opening $c$, and then the stop-cock $e$ is opened as far as desired consistent with the nature of the disease, its extent, and the ability of the patient to stand the effect of the fumes which arise from the medicament-chamber. It will thus be seen that the duration and rigor of the treatment are absolutely controllable.

I do not wish to be confined to the exact construction and arrangement of my invention as hereinbefore described, as it is obvious the same may be changed without departing from the spirit of my invention, the essential features of which are the perforated seat, the medicament-chamber and receptacles contained therein, and the valve-controlled connection between said chamber and the perforation of the seat.

What I claim as new is—

1. A therapeutic cabinet comprising a medicament-chamber, a receptacle removably contained therein, a seat with an outlet-opening therein for said chamber, and a valve-controlled pipe connecting said chamber and said outlet-opening.

2. A therapeutic cabinet consisting of a box-shaped case the top of which forms a seat and has a suitable opening therein, and contains a medicament-chamber, and valve-controlled means operated from the outside of said chamber for regulating the output of fumes from said chamber through said opening in the top.

3. A therapeutic cabinet consisting of a rectangular case the top of which forms a seat and has a suitable opening therein and has a partition dividing it into an upper and lower chamber, which latter is provided with a normally closed entrance-opening, and a valve-controlled pipe connecting said opening with said lower chamber.

4. A therapeutic cabinet consisting of a rectangular case the top of which forms a seat and has a suitable opening therein and has a partition dividing it into an upper and lower chamber, which latter is provided with a normally closed entrance-opening, a pipe connecting said opening with said lower chamber, and a stop-cock in said pipe having a horizontal shaft or spindle extending outside of said case and provided with a suitable means for turning it.

In testimony whereof I hereunto set my hand this 9th day of November, 1903.

BENJAMIN F. JOHNSON.

Witnesses:
JOHN S. MURPHY,
FRANK J. BUTLER.